United States Patent [19]

Szysh

[11] 4,416,357
[45] Nov. 22, 1983

[54] GUIDE STRUCTURE FOR TROLLEY RAIL AND FLYING PICKUP

[76] Inventor: John A. Szysh, P.O. Box 309, York, Pa. 17405

[21] Appl. No.: 297,318

[22] Filed: Aug. 28, 1981

[51] Int. Cl.³ .............................................. B60M 1/34
[52] U.S. Cl. .................................... 191/23 A; 191/30; 191/58; 191/72; 191/59.1
[58] Field of Search ..................... 191/49, 57, 59.1, 72, 191/48, 39, 23 A, 30, 58

[56] References Cited

U.S. PATENT DOCUMENTS

| | | | |
|---|---|---|---|
| 2,838,620 | 6/1958 | Herrmann | 191/23 A |
| 3,152,673 | 10/1964 | Duffy | 191/39 X |
| 4,050,555 | 9/1977 | Ross | 191/23 A |

FOREIGN PATENT DOCUMENTS 473626 1/1976 U.S.S.R. ................................ 191/72

Primary Examiner—Richard A. Schacher
Attorney, Agent, or Firm—Kemon & Estabrook

[57] ABSTRACT

An overhead plural conductor trolley rail and flying pickup for supplying electrical power to a vehicle includes a plastic extrusion fastened to an overhead structure housing parallel flat conductors, the exposed underside of each of the conductors being engaged by shoes carried on vehicle supported trolley units. At one end of the rail a guide structure for the trolley includes a central, side skirted or inverted channel shaped portion, flanked at either end by oppositely extending side-skirted ramps each inclined upwardly from the central portion. The approach ramp also diverges horizontally outwardly of the rail support. To accurately engage the trolley carried shoes with the rails, the operator need only insure that the trolley enters the divergent portion of the guide at its widest open end. When the trolley is advanced to the central portion of the guide by forward movement of the vehicle the shoes will be automatically horizontally aligned but vertically spaced from the rails so that further inward movement of the trolley along the inner upwardly inclined exit section insures that the shoes will rise accurately into engagement with the rails. The trolley units are biased vertically upwardly toward the guides and the rails.

4 Claims, 9 Drawing Figures

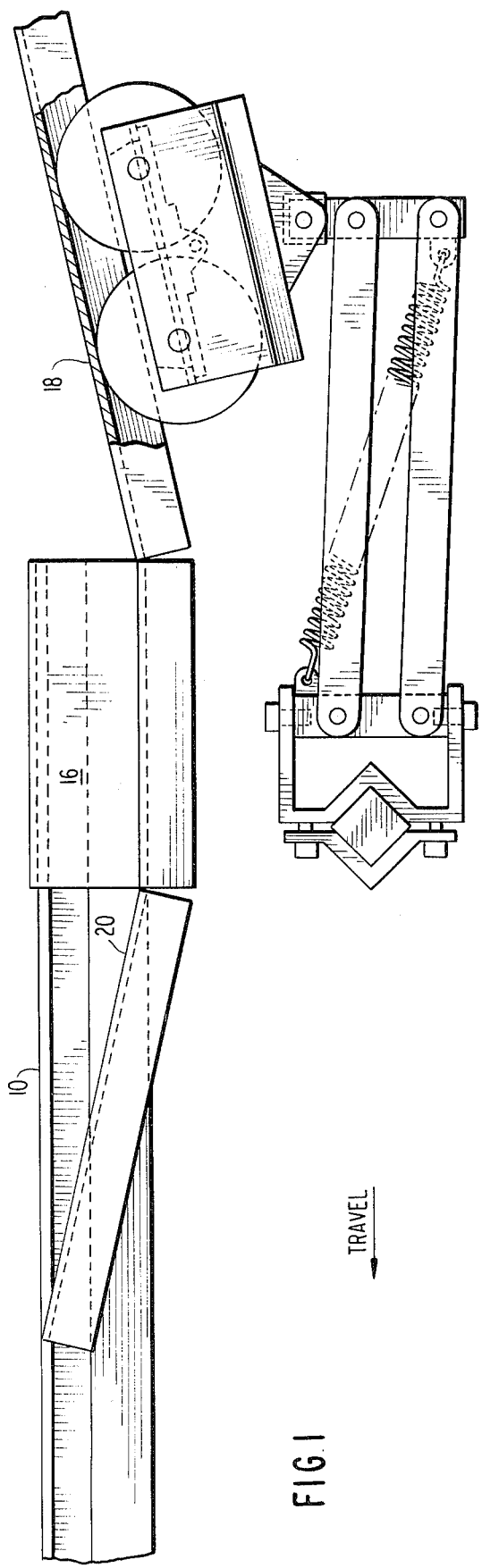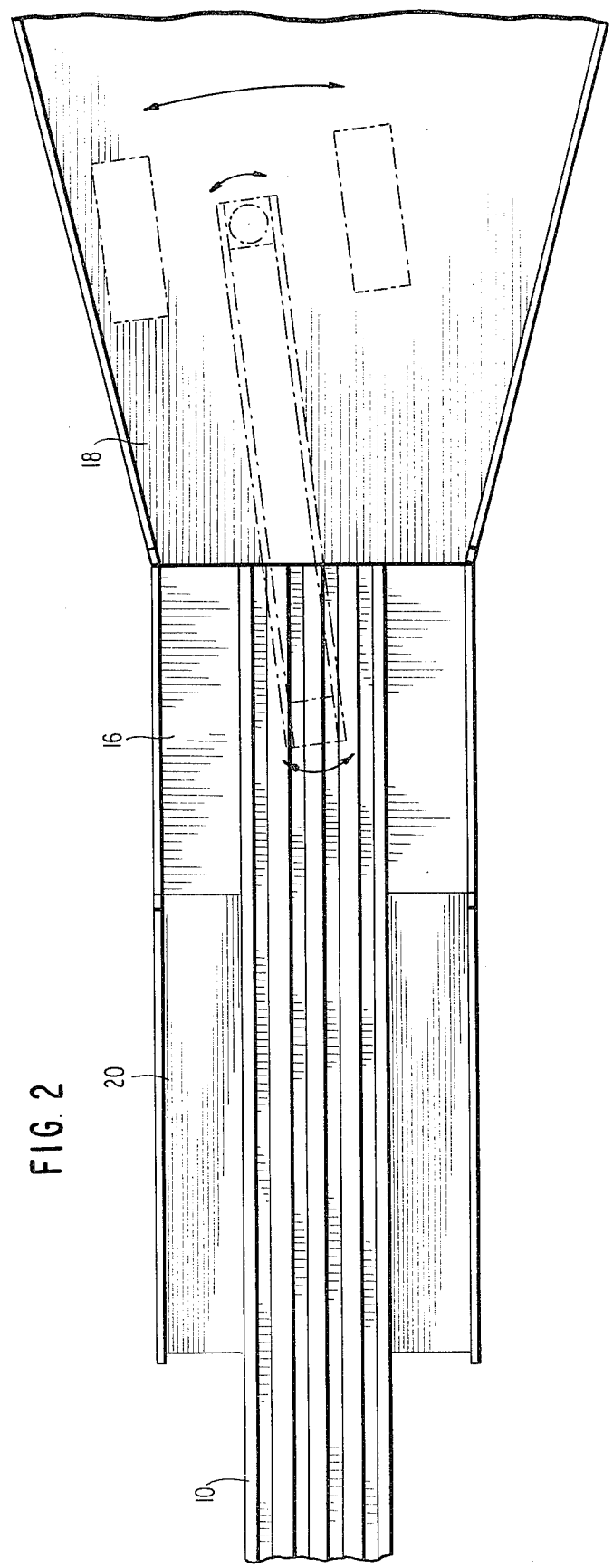

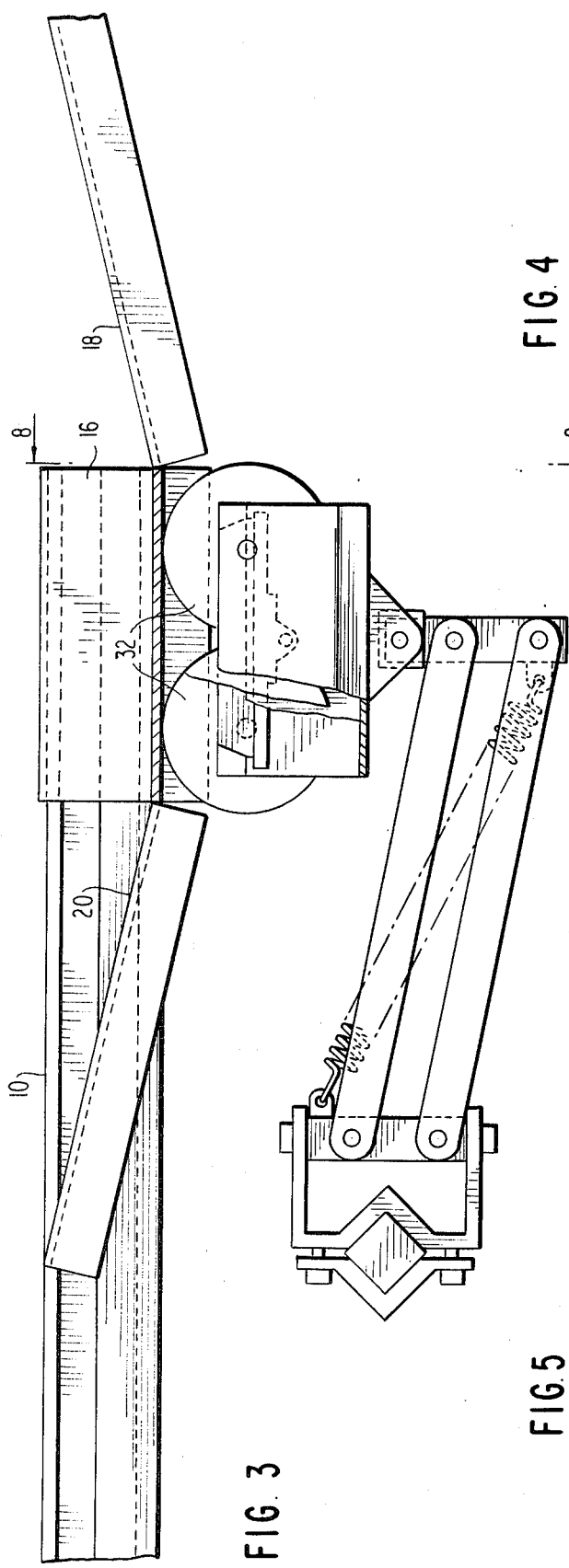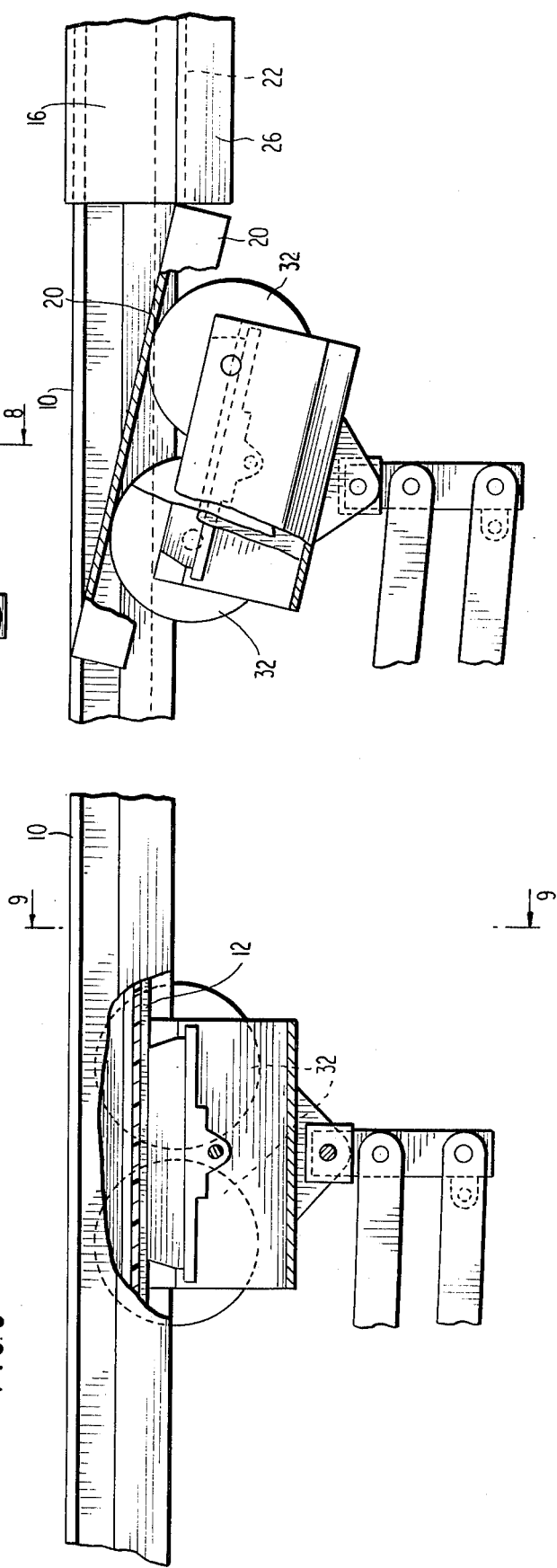

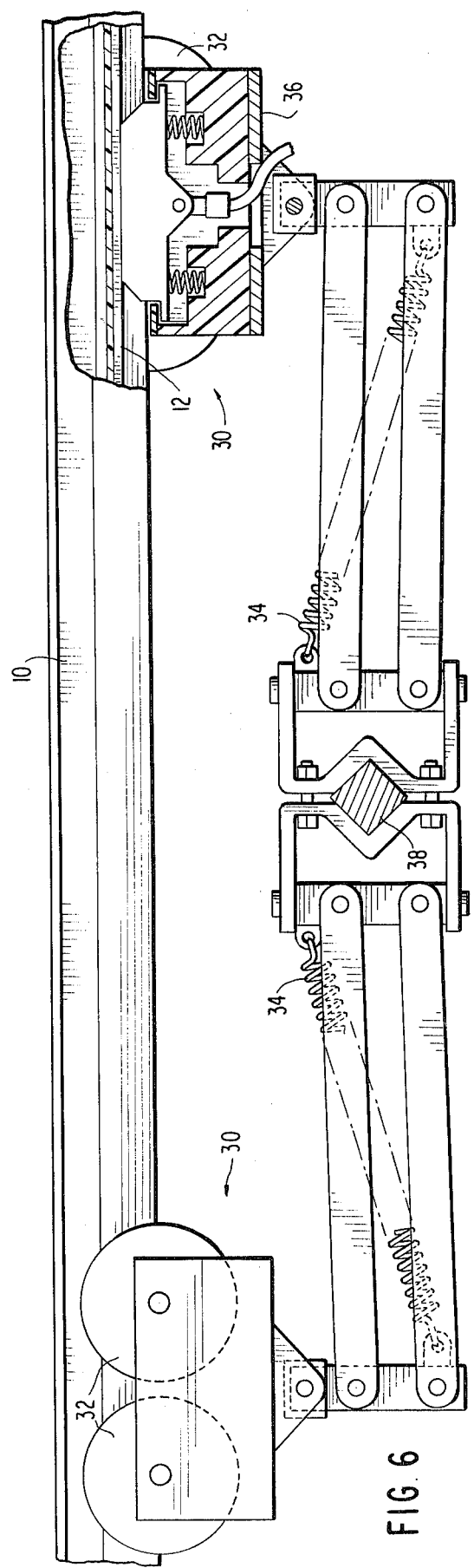
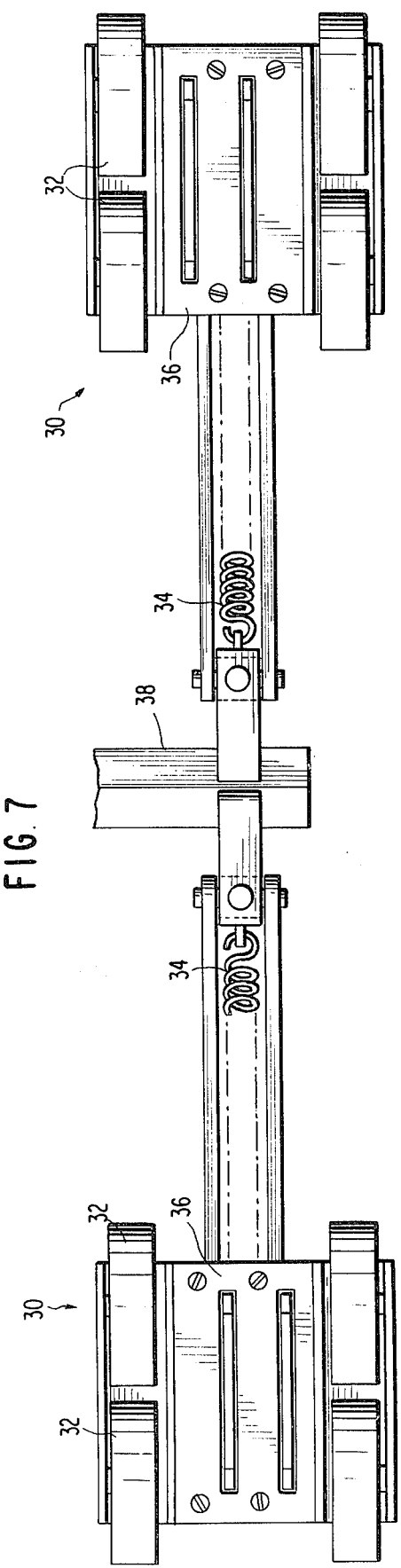

GUIDE STRUCTURE FOR TROLLEY RAIL AND FLYING PICKUP

BACKGROUND OF THE INVENTION

In modern warehousing operations, it is common to employ storage racks extending in rows with sufficient aisle space between to permit deployment of automatic stacker cranes or operator driven vehicles. In either case, the cranes or the vehicles must be capable of moving materials between the ground level and the uppermost racks. Where operator controlled vehicles are used, it is common for the vehicles to have on-board batteries for propelling the vehicles along the floor between aisles. Electrical energy for raising and lowering, loads, however, is supplied from an overhead electrical rail system usually supplying three phase electrical power at a voltage for 460 volts. The problem arises when such vehicles are to be moved from one aisle to another requiring removal of the trolley from contact with the rails in one aisle and re-establishing contact with the rails in the next aisle. The problem is particularly acute where the height of the rails above the operator of the vehicle may be of the order of 60 feet.

One approach to the problem is disclosed in U.S. Pat. No. 4,194,603 of Mar. 25, 1980. In that patent, the ends of the trolley rails are bent upwardly and the rail structure and housing terminates in an outwardly tapered insulating end fitting. A pair of horizontally spaced guide members extend upwardly from the uppermost surface of the trolley, the spacing being substantially equal to the horizontal dimension of the rail housing structure. The theory is that the operator need only position these guide members to straddle the tapered "nose cone" and further advancement will serve to align the trolley with the elevated end portions of the rail. The difficulty is that there is insufficient tolerance for horizontal alignment in view of the vertical distance between the vehicle and the rails so that while the approach shown in this patent is an improvement over no guide structure at all, it still is not a complete answer to the problem.

BRIEF SUMMARY OF THE INVENTION

In accordance with the present invention, the problem is approached from substantially the opposite direction taken in the above-mentioned patent. Specifically, the end of the rail structure housing is provided with a guide member means in the form of a horizontally extending, downwardly skirted or inverted channel-shaped guide member having an approach portion which diverges outwardly and upwardly of the rails. The trolley is provided with guide engaging members, preferably a series of idler wheels, which engage with the underside of the skirted guide members between opposite skirts. The operator therefore, need make only a very coarse alignment sufficient to place the trolley wheels within the widely divergent portion of the guide. Further movement toward the rails as the vehicle is advanced, is effective by virtue of the downwardly extending skirts on either side of the guide to accurately center the trolley with respect to the rails by the time that the trolley is in engagement with the central portion of the guide. At this point, the shoes are horizontally accurately aligned with the rails but spaced vertically below the rails. The exit ramp of the guide means permits the idler wheels to ride up the inclined ramp insuring a smooth rise of the shoes into accurately aligned engagement with the rails

BRIEF DESCRIPTION OF THE DRAWINGS

FIG. 1 is a side elevation partially in section showing the guide structure applied to one end of the trolley rails with the trailing half of the trolley member engaging with the outwardly divergent approach portion of the guide member;

FIG. 2 is a bottom view of the FIG. 1 with the trailing half of the trolley indicated in dotted line;

FIG. 3 is a view similar to FIG. 1 but with the trailing half of the trolley advanced to engage with the center portion of the guide;

FIGS. 4 and 5 show respectively the approach of the trailing half of the trolley to the rails while still in engagement with the exit side of the guide and finally the shoe-rail engaging position of the trolley;

FIG. 6 is a side elevation partially in section showing the entire trolley in shoe-rail engaging position;

FIG. 7 is a top plan view of the entire trolley;

DETAILED DESCRIPTION

Figure 9:
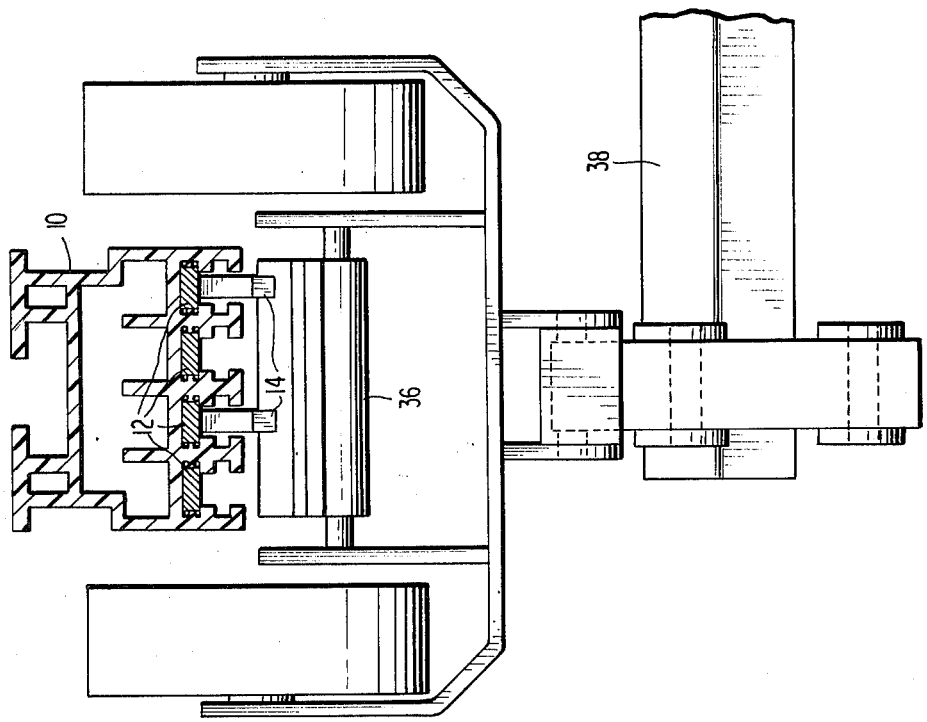
FIG. 9 is a sectional view on the lines 9—9 of FIG. 5.

Referring first to FIG. 9 of the drawing, a series of longitudinally sectioned plastic extrusions 10 form the support for the trolley rails 12. The extrusions are fastened in any convenient manner to the overhead structure of the warehouse so as to be in a common horizontal plane. Once the extrusions are in position, the rails are simply threaded into the retaining slots which hold them in the position shown with their lower surface open to engagement by conductive shoes or brushes carried by the upper surface of the trolley.

Figure 8:
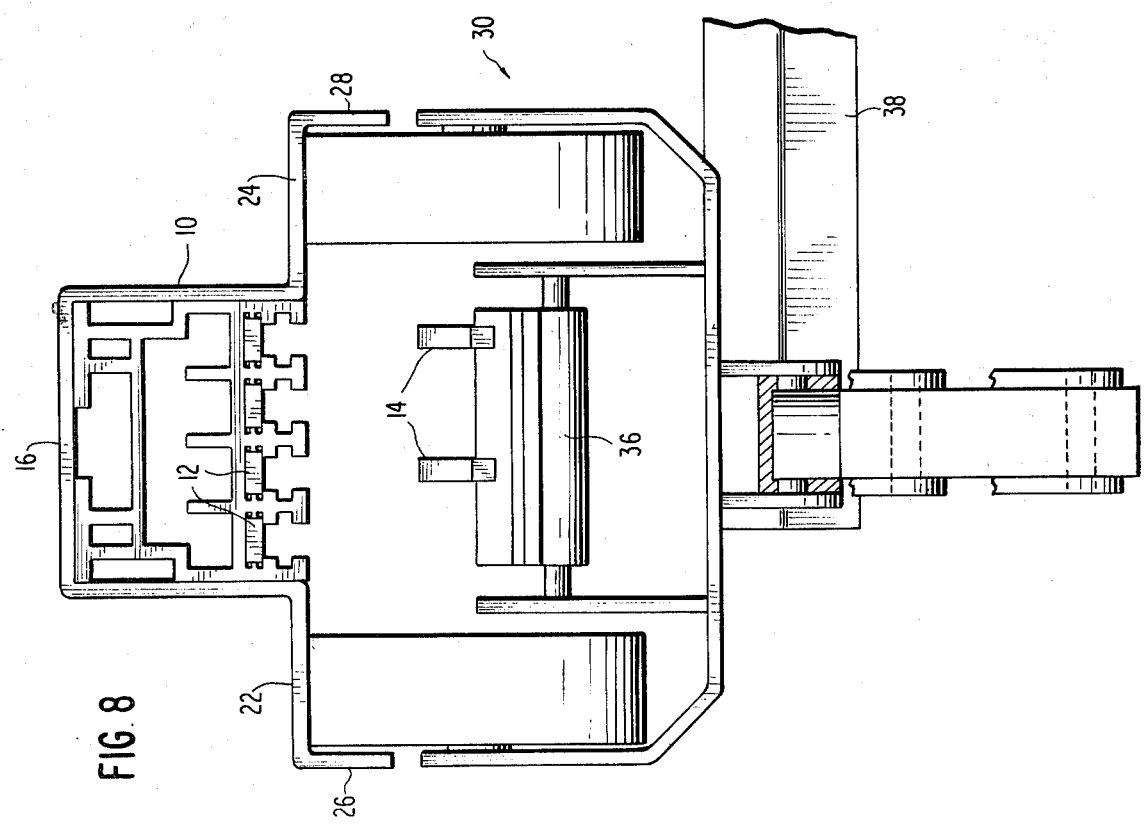
FIG. 8 is a sectional view on the lines 8—8 of FIG. 6.

Referring now to FIGS. 1, 2 and 6 for a description of the trolley guide structure of the present invention, the guide includes a central portion 16 flanked at either end by upwardly inclined, entry and exit ramp portions 18 and 20. Each of the three guide portions include oppositely disposed horizontally extending guide members 22 and 24 which terminate at their outer ends in depending skirt members 26 and 28. These are illustrated in FIG. 8 with respect to the center guide portion 16. The entry portion 18 of the guide member as shown most clearly in FIG. 2 diverges widely outwardly of the rails and supporting housing 10.

Referring now to FIGS. 6 and 7 for a disclosure of one embodiment of a trolley useful with the present invention, it will be seen that the trolley includes two similar units 30 each of which includes two pair of idler wheels 32 to engage with the underside of the guide structure described above. Each unit is pivotally mounted in two planes and biased toward the underside of the rails by springs 34 as is conventional in this art. The two units 30 each carry two horizontally spaced rail engaging shoes 36 the shoes in one unit engaging the 1st and 3rd rails and those in the other unit engaging the 2nd and 4th rails. This staggering of the shoes provides spacing sufficient to prevent arc-over between adjacent rails where the supply for example is 3 phase 460 volts. Each shoe 36 is pivotally mounted on an axis transverse to the rails and spring biased toward the rails as is conventional in this art.

The entire trolley shown in these Figures will be mounted at the top of a tower which extends vertically upwardly of the vehicle for distances of the order of 60 feet. While the actual mounting hardware could take any known form, the support bar 38 of FIGS. 6 and 7 could be supported on or be an integral part of the vehicle tower and the trolley units 30 clamped to the bars as indicated.

OPERATION

The guide structure permits the vehicle operator a very wide latitude in initially aligning the trolley with the rails. He needs only to position the trolley anywhere within the widely outwardly diverging mouth of the approach portion 18 of the guide as shown in FIGS. 1 and 2. As the trolley moves toward the rails, both units 30 are automatically successively brought into a position where the shoes 36 are accurately horizontally aligned with the rails 12 by the time that either trolley unit reaches the center portion of the guide as shown in FIG. 3. At this point, it will be noted that while horizontal alignment is complete, the rails and shoes are nevertheless vertically spearated. As the trolley units proceed through the exit ramp of the guide as shown in FIG. 4, they automatically rise to a position where the shoes 36 engage the undersurface of the rails 12 as shown in FIGS. 5 and 9. As will be noted in FIG. 9, the wheels 30 of the trolley have completely cleared the ramp of the guide and serve no further function until the operator has need to move the vehicle from one aisle to the next.

From the foregoing, it will be apparent to those skilled in the art that this is herein shown and disclosed a new and useful guide structure for ensuring proper alignment between a trolley and overhead rails, when the rails are spaced a substantial distance above the operator of the vehicle carrying the trolley. While a preferred embodiment has been herein shown and disclosed, Applicant claims the benefit of a full range of equivalents within the scope of the appended claims.

I claim:

1. In combination with a substantially horizontal, overhead trolley rail housing having a plurality of parallel open bottom slots extending lengthwise of the housing;
   a plurality of electric rail conductors, one mounted up in each said slot respectively and providing a downwardly facing, collector-contacting, rail surface;
   a trolley unit, carried by a vehicle which unit may be of the order of 60 feet vertically above the vehicle operator, said unit having anumber of contact shoes equal to the number of said conductors and being adapted to engage therewith, to be removed therefrom and returned thereto, said unit permitting both lateral and vertical movement with respect to said housing and including means for biasing said contact shoes into engagement with said downwardly facing surface of said conductors;
   inverted channel shaped guide means for automatically aligning the contact shoes carried by said trolley with said rails, said guide means including an approach section extending from one end of said housing, sloping upwardly therefrom and diverging horizontally widely outwardly of said housing, a central section, and an exit section sloping upwardly from said central section toward said rails, the horizontal dimension of the channel of said central and exit sections being such that said trolley when travelling therethrough has said contact shoes accurately horizontally aligned with said rails, the horizontal portion of said central section being vertically positioned so that when said trolley is within said section, said contact shoes are spaced below said rails;
   whereby positioning of the trolley in said approach section and advancing it successively through all three sections is effective first to align said contact shoes horizontally with the rails and simultaneously space said contact shoes below the level of the rails and then permit the trolley to rise vertically while maintaining horizontal alignment until said contact shoes smoothly and accurately engage with the undersurface of the rails.

2. The combination defined by claim 1 in which said guide members are supported directly on an end of said housing.

3. The combination defined by claim 1 in which there are four rails supported in said housing and four contact shoes carried by said trolley.

4. The combination defined by any one of claims 1 to 3 in which the guide means carried by said trolley comprises freely rotatable wheels which engage the undersurface of said inverted channel shaped guide means until aligned contact is established between said shoes and said rails said wheels thereafter merely straddling said housing.

* * * * *